United States Patent [19]

Faranetta et al.

[11] 4,385,203

[45] May 24, 1983

[54] SEALED CABLE AND METHOD OF MANUFACTURING

[75] Inventors: John G. Faranetta, Rocky Hill; Robert G. Feller, West Milford, both of N.J.

[73] Assignee: The Okonite Company, Ramsey, N.J.

[21] Appl. No.: 239,974

[22] Filed: Mar. 3, 1981

[51] Int. Cl.³ .............................................. H01B 7/22
[52] U.S. Cl. ...................................... 174/107; 156/53;
174/23 C; 174/102 D; 174/102 SC; 174/110
AR; 174/110 B; 174/110 S; 174/120 AR
[58] Field of Search ........... 174/23 C, 102 R, 102 SC,
174/102 D, 102, 106 D, 106 SC, 107, 110 B, 110
AR, 110 S, 120 AR; 156/48, 51, 53

[56] References Cited

U.S. PATENT DOCUMENTS

| | | | |
|---|---|---|---|
| 3,878,319 | 4/1975 | Wahl | 174/106 SC |
| 3,888,709 | 6/1975 | Burk | 156/48 |
| 3,944,717 | 3/1976 | Hacker | 174/23 C |
| 4,104,480 | 8/1978 | Thompson | 174/23 C |
| 4,269,638 | 5/1981 | Faranetta et al. | 156/53 |
| 4,270,961 | 6/1981 | Faranetta et al. | 156/51 |
| 4,288,144 | 9/1981 | Nakai et al. | 174/23 C X |

Primary Examiner—Volodymyr Y. Mayewsky
Attorney, Agent, or Firm—Stephen B. Judlowe

[57] ABSTRACT

An improved sheathed cable and method for producing same is described. The cable includes an inner insulated conductor/conductor group, an outer corrugated metal sheath, and a barrier layer of a pliable, inert sealing material disposed therebetween to prevent the passage of gas or vapors via the cable. The method includes the steps of applying the pliable material around the inner insulated conductor/conductor group, wrapping the pliable material with a flexible tape, forming an outer metallic sheath around the material, and making annular corrugations in the outer sheath so as to compress the sealing compound.

6 Claims, 3 Drawing Figures

SEALED CABLE AND METHOD OF MANUFACTURING

BACKGROUND AND SUMMARY OF THE INVENTION

This invention relates generally to a high power cable and method for the production of such continuous sheathed cable. Specifically, the invention is directed to a method for producing continuous sheathed cable that will not transmit gas or vapors and, accordingly, is usable in corrosive or explosive ambient environments.

This is an improvement on U.S. patent applications Ser. Nos. 083,538 filed Oct. 10, 1979, issued May 26, 1981 as U.S. Pat. No. 4,269,638; 083,414 (abandoned); and 083,540 filed Oct. 10, 1979, issued June 2, 1981 as U.S. Pat. No. 4,270,961 assigned to the assignee hereof.

The improved method permits the continuous production of sheathed cable utilizing a pliable, inert sealing material and annular corrugations to prevent passage of gases or vapors along the cable core. The composite cable formed by the instant methodology includes an insulated and often jacketed conductor or conductor ensemble, an outer metal corrugated sheath, and a layer of pliable sealing material wrapped with tape disposed between the conductor assembly and the outer metallic sheath. The improved method includes extruding or pumping a layer of sealing compound around the insulated conductor, wrapping the sealing compound with flexible tape, forming a sealed metallic sheath around the composite assembly, and corrugating the outer metallic sheath to compress the sealing compound and fill the space between the inner and outer members thereby forming an air-tight seal. The sealing compound may be continuously or periodically applied along the length of the cable.

Many national and local building and electrical codes require sealed, sheathed cable to meet rigorous standards with regard to the transmission of gases or vapors through the core of the cable. One such standard is set out in the National Electrical Code promulgated by the National Fire Protection Association at Article 501, Paragraph (e) (2) which limits gas or vapor flow through a cable to a maximum of 0.007 cubic feet per hour of air at a pressure of 6 inches of water. The sheathed cable produced by the improved method of the present invention fully meets the National Electrical Code standard.

Accordingly, it is an object of this invention to provide an improved continuous sheathed cable and method for its production.

It is another object of this invention to provide an improved method for producing sheathed cable which is impervious to the passage of gas or vapors.

It is another object of this invention to provide an improved method for producing sheathed cable utilizing a pliable sealing compound and annular corrugations.

These and other objects, features, and advantages of the invention will be better understood by reference to the following drawings read in conjunction with the detailed description of illustrative embodiments to follow.

DESCRIPTION OF THE PREFERRED EMBODIMENT

Figure 1:
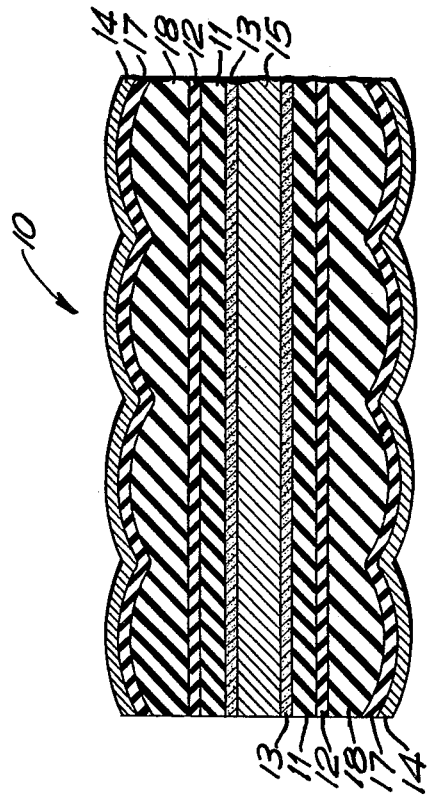
FIGS. 1 and 2 are respectively perspective and axial cross-sectional views of of the improved sheathed cable constructed in accordance with the method of the present invention.

FIG. 1 illustrates a perspective view of a continuous sheathed cable 10 fabricated in accordance with the principles of the instant invention. The composite cable includes a conductor or conductor group 15 which may comprise any combination of individual conductors, multistrand or multiconductor groups or the like. The area in and about individual conductors in conductor group 15 is advantageously sealed in a manner customary to those of skill in the art in view of the gas and vapor blocking requirement for cable 10 of the instant invention.

In one illustrative embodiment, center conductor group 15 is surrounded by a layer 13 of a semiconducting material utilized for its traditional purpose of eliminating local air voltage breakdown (corona) by converting the irregular outer conducting surface of the individual conductors in conductor group 15 to the regular outer surface of semiconductors layers 13. An insulator 11 and a cable core jacketing material 12 of any well known type are disposed about semiconductor layer 13. It should be noted that the instant invention may contain a core of any type. Thus, for example, such cable cores need not employ a jacket 12 and/or the inner semiconductor layer 13.

The cable core jacket 12 and its interior elements are surrounded by a soft, pliable sealing compound 18. Many pliable elastomeric materials, well known to those skilled in the art, are suitable for the instant purposes, for example, polyisobutylene rubber loaded with clay or other inert filler, silicon rubber or the like. The only requirement is that the sealing compound remains pliable throughout the cable lifetime. Sealing compound 18 is wrapped with a flexible tape 17 such as commonly used in the art.

Figure 2:
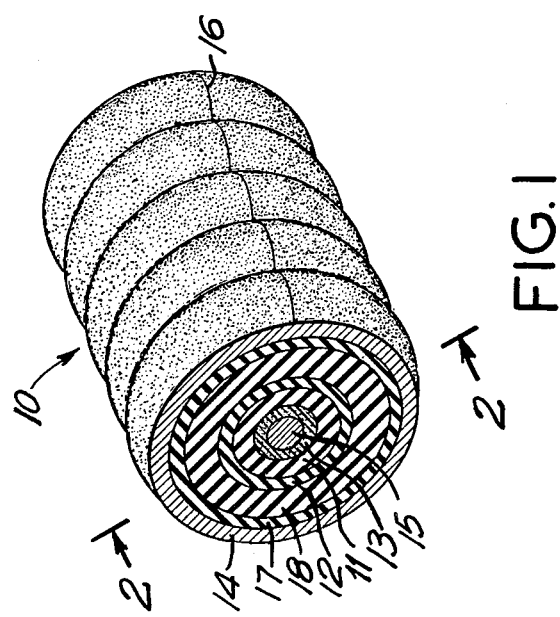

A metallic sheath 14 is disposed about the tape-wrapped cable composite. Metallic sheath 14 contains a longitudinal weld seam 16 to form an air-tight seal. Sheath 14 is corrugated as shown in FIGS. 1 and 2 to compress sealing compound 18 and form a barrier to vapor or gas flow along the cable core. Sheath 14 provides mechanical protection and integrity for composite cable 10 and the annular corrugations provide improved sealing against air or vapor propogation.

Figure 3:
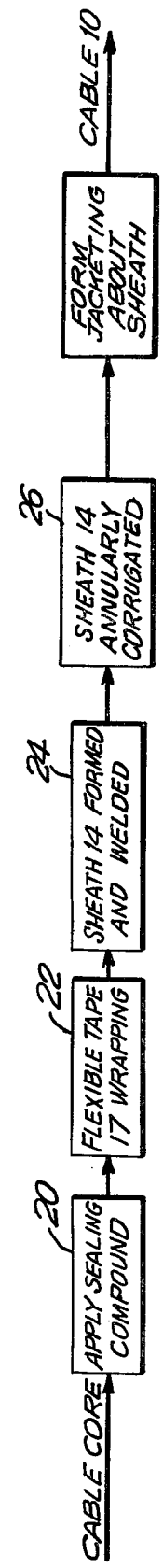
FIG. 3 is a flow diagram of the steps of the improved method.

The method for producing the cable of FIGS. 1 and 2 is set forth in the flow diagram of FIG. 3. The cable core comprising inner conductor 15, insulation 11 and their ancillary components first have extruded or pumped thereabout (process step 20) the putty-like sealing compound 18. The sealing compound may be continuously or intermittently applied depending on the intended use of the cable. A barrier to passage of potentially harmful vapors via the space between metallic sheath 14 and the cable core is provided at least in those locations where the sealing compound is present.

Pliable sealing material 18 is then wrapped with a flexible tape (operation 22) to preserve its integrity. Suitable tape includes supported or unsupported rubber or fabric compound-filled tape. Tape 17 may be helically wrapped or applied longitudinally and overlapped.

Following application of tape 17, the metallic sheath 14 is formed (operation 24) and corrugated (operation 26). In brief, sheath 14 formation is typically effected by by continuously dispensing a strip of metallic tape, typically aluminum of a thickness on the order of 25 mils; bending the strip in a forming die to form a cylinder around the cable; welding the ends of the sheath strip to form a sealed seam; and forming the annular corrugations so that composite cable is sealed, preventing passage therethrough of potentially harmful or explosive fumes, vapors or the like.

Forming a welded seam on the metallic sheath enables a better seal between sheath, sealing compound, and cable core. It also enables better control of pressure during the corrugation step. Typically, cable corrugation is helical. If air or vapor leaks into the cable, it can propagate longitudinally along the helical turns. In the preferred embodiment of this invention, the corrugations are formed annularly around the cable core. Thus, each compressed portion acts as an air lock around the entire circumference forming an effective hermetic seal against the propagation of air or vapor. Furthermore, the annular corrugations in combination with the pliable sealing compound provide greater flexibility of the cable.

Metallic sheath 14 may be covered with a protective jacket (not shown). A polymeric material, such as polyvinylchloride or polyethylene, which resists chemicals or corrosive atmospheres is suitable.

The above described structures and methodology are merely illustrative of the principles of the present invention. Modifications and adaptations thereof will be readily apparent to those skilled in the art without departing from the spirit and scope of the present invention.

We claim:
1. A non-vapor propagating sheathed high power cable comprising:
    (a) at least one inner conductor;
    (b) a layer of semi-conductive material disposed about said inner conductor, said layer of semi-conductive material having a regular outer cylindrical surface;
    at least one layer of insulated material disposed about said semi-conductive layer;
    (d) a barrier layer of pliable sealing compound formed around said layer of insulative material;
    (e) a flexible tape disposed around said sealing compound to maintain its integrity; and
    (f) a metallic sheath around said tape, said sheath having annular corrugations to deform said barrier layer to prevent vapor propagation through the cable.
2. The cable of claim 1 further comprising an outer protective jacket around said metallic sheath.
3. The cable of claim 1 wherein said sealing compound is present only at spaced points along the longitudinal axis of said core.
4. The cable of claim 1 wherein said barrier layer comprises a pliable polymeric material with an inert filler.
5. The cable of claim 4 wherein said polymeric material comprises polyisobutylene rubber.
6. The cable of claim 4 wherein said barrier layer comprises silicon rubber.

* * * * *